United States Patent
Johnson

(10) Patent No.: US 11,127,998 B2
(45) Date of Patent: Sep. 21, 2021

(54) THERMO-ELECTROCHEMICAL CONVERTER

(71) Applicant: Johnson IP Holding, LLC, Atlanta, GA (US)

(72) Inventor: Lonnie G. Johnson, Atlanta, GA (US)

(73) Assignee: JOHNSON IP HOLDING, LLC, Atlanta, GA (US)

( * ) Notice: Subject to any disclaimer, the term of this patent is extended or adjusted under 35 U.S.C. 154(b) by 502 days.

(21) Appl. No.: 15/892,794

(22) Filed: Feb. 9, 2018

(65) Prior Publication Data
US 2018/0166724 A1    Jun. 14, 2018

Related U.S. Application Data

(63) Continuation-in-part of application No. PCT/US2017/046203, filed on Aug. 10, 2017.
(Continued)

(51) Int. Cl.
*H01M 8/18* (2006.01)
*H01M 8/04858* (2016.01)
(Continued)

(52) U.S. Cl.
CPC ....... *H01M 14/00* (2013.01); *H01M 8/04029* (2013.01); *H01M 8/04925* (2013.01);
(Continued)

(58) Field of Classification Search
CPC .................................. H01M 8/04925–182
See application file for complete search history.

(56) References Cited

U.S. PATENT DOCUMENTS

| 5,310,608 A | * | 5/1994 | Ishizawa | ............... | H01M 8/182 429/11 |
| 7,160,639 B2 | | 1/2007 | Johnson et al. | | |

(Continued)

FOREIGN PATENT DOCUMENTS

| EP | 0595688 A1 | 5/1994 |
| EP | 2745930 A1 | 6/2014 |

(Continued)

OTHER PUBLICATIONS

International Search Report and Written Opinion dated Oct. 4, 2017 in Int'l Application No. PCT/US2017/046203.
(Continued)

*Primary Examiner* — Osei K Amponsah
(74) *Attorney, Agent, or Firm* — Panitch Schwarze Belisario Nadel LLP

(57) ABSTRACT

A direct heat to electricity engine includes solid state electrodes of an electrochemically active material that has an electrochemical reaction potential that is temperature dependent. The electrodes are configured in combination with electrolyte separators to form membrane electrode assemblies. The membrane electrode assemblies are grouped into pairs, whereby each membrane electrode assembly of a given pair is ionically and electronically interconnected with the other. One membrane electrode assembly of a given pair is coupled to a heat source with the other to a heat sink. One membrane electrode assembly of the pair is electrically discharged while the other is electrically charged, whereby the net and relative charge between the two remains constant because of the electronic and ionic interconnection and the difference in temperature of the membrane electrode assemblies, and thereby voltage, results in net power generation.

15 Claims, 6 Drawing Sheets

Related U.S. Application Data

(60) Provisional application No. 62/374,252, filed on Aug. 12, 2016.

(51) Int. Cl.
*H01M 14/00* (2006.01)
*H01M 8/04029* (2016.01)
*H01M 8/22* (2006.01)
*H01M 8/04007* (2016.01)

(52) U.S. Cl.
CPC .......... *H01M 8/182* (2013.01); *H01M 8/227* (2013.01); *H01M 8/04074* (2013.01); *Y02E 60/50* (2013.01)

(56) References Cited

U.S. PATENT DOCUMENTS

| | | | |
|---|---|---|---|
| 10,137,409 B2 | 11/2018 | Hoshino et al. | |
| 2003/0203276 A1* | 10/2003 | Johnson | F25B 23/00 429/120 |

FOREIGN PATENT DOCUMENTS

| | | | | |
|---|---|---|---|---|
| JP | H02276162 A | * | 11/1990 | .............. H01M 6/00 |
| WO | 2016025372 A1 | | 2/2016 | |

OTHER PUBLICATIONS

Gellender, M., "A proposed new energy source: The "mixing energy" of engine exhaust gas," Journal of Renewable and Sustainable Energy, vol. 2, pp. 023101-1-023101-14 (2010).

Joshi, Dr. Ashok V., "Thermoelectric Conversion with Ion Conductors," Final Report, Contract #N00014-86-C-0827, 40 pages (Jan. 1990).

Virkar et al., "Theoretical Assessment of an Oxygen Heat Engine: The Effect of Mass Transport Limitation," Energy Convers. Mgmt., vol. 32, No. 4, pp. 359-370 (1991).

Office Action dated Feb. 16, 2021 in U.S. Appl. No. 16/324,773, by Johnson.

\* cited by examiner

THERMO-ELECTROCHEMICAL CONVERTER

CROSS-REFERENCE TO RELATED APPLICATIONS

This application is a continuation-in-part (CIP) of International Application No. PCT/US17/46203 filed Aug. 10, 2017, which claims priority under 35 U.S.C. § 119 to Provisional Patent Application No. 62/374,252, filed Aug. 12, 2016, the entire disclosures of which are herein incorporated by reference.

BACKGROUND OF THE INVENTION

The conversion of heat energy or chemical energy to electrical energy, or visa-versa, may be accomplished in a variety of ways. For example, known electrochemical cells or batteries rely on chemical reactions, wherein ions and electrons of a reactant being oxidized are transferred to the reactant being reduced via separate paths. Specifically, the electrons are transferred electrically via wiring through an external load where they perform work and the ions are conducted through an electrolyte separator.

However, battery type electrochemical cells can produce only a limited amount of energy, because the confines of the battery casing limit the amount of available reactants that may be contained therein. Although such cells can be designed to be recharged by applying a reverse polarity current/voltage across the electrodes, such recharging requires a separate electrical source. Also, during the recharging process, the cell is typically not usable.

Fuel cells have been developed in an effort to overcome problems associated with battery type electrochemical cells. In conventional fuel cells, the chemical reactants are continuously supplied to and removed from the electrochemical cell. In a manner similar to batteries, fuel cells operate by conducting an ionized species through a selective electrolyte within a membrane electrode assembly (MEA) which generally blocks passage of electrons and non-ionized species.

The most common type of fuel cell is a hydrogen-oxygen fuel cell which passes hydrogen through one of the electrodes and oxygen through the other electrode. Porous electrodes on either side of the electrolyte separator membrane are used to couple the electrons involved in the chemical reaction to an external load via an external circuit. The hydrogen ions are conducted through the electrolyte separator to the oxygen side of the cell under the chemical reaction potential of hydrogen and oxygen. On the oxygen side, the electrons and hydrogen ions reconstitute hydrogen and complete the reaction with oxygen resulting in the production of water which is expelled from the system. A continuous electrical current as hydrogen and oxygen are continuously supplied to the cell.

Mechanical heat engines have also been designed and used to produce electrical power. Such mechanical heat engines operate on thermodynamic cycles, wherein shaft work is performed using a piston or turbine to compress a working fluid. The compression process is performed at a low temperature and, after compression, the working fluid is raised to a higher temperature. At the high temperature, the working fluid is allowed to expand against a load, such as a piston or turbine, thereby producing shaft work. A key to the operation of all engines employing a working fluid is that less work is required to compress the working fluid at low temperatures than that produced by expanding it at high temperatures. This is the case for all thermodynamic engines employing a working fluid.

For example, steam engines operate on the Rankine thermodynamic cycle, wherein water is pumped to a high pressure, and then heated to steam and expanded through a piston or turbine to perform work. Internal combustion engines operate on the Otto cycle, wherein low temperature ambient air is compressed by a piston and then heated to very high temperatures via fuel combustion inside the cylinder. As the cycle continues, the expansion of the heated air against the piston produces more work than that consumed during the lower temperature compression process.

The Stirling engine has been developed to operate on the Stirling cycle in an effort to provide an engine that has high efficiency and offers greater versatility in the selection of the heat source. The ideal Stirling thermodynamic cycle is of equivalent efficiency to the ideal Carnot cycle, which defines the theoretical maximum efficiency of an engine operating on heat input at high temperatures and heat rejection at low temperatures. However, as with all mechanical engines, the Stirling engine suffers from reliability problems and efficiency losses associated with its mechanical moving parts.

In an effort to avoid the problems inherent with mechanical heat engines, Alkali Metal Thermo-Electrochemical Conversion (AMTEC) cells have been designed as a thermos-electrochemical heat engine. AMTEC heat engines utilize pressure to generate a voltage potential and electrical current by forcing an ionizable working fluid, such as sodium, through an electrochemical cell (membrane electrode assembly, MEA) at high temperatures. The electrodes couple the electrical current to an external load. Electrical work is performed as the pressure differential across the electrolyte separator forces molten sodium atoms through the electrolyte. The sodium is ionized upon entering the electrolyte, thereby releasing electrons to the external circuit. On the other side of the electrolyte, the sodium ions recombine with the electrons to reconstitute sodium upon leaving the electrolyte, in much the same way as the process that occurs in battery and fuel cell type electrochemical cells. The reconstituted sodium, which is at a low pressure and a high temperature, leaves the electrochemical cell as an expanded gas. The gas is then cooled and condensed back to a liquid state. The resulting low-temperature liquid is then re-pressurized. Operation of an AMTEC engine approximates the Rankine thermodynamic cycle.

Numerous publications are available on AMTEC technology. See, for example, *Conceptual design of AMTEC demonstrative system for* 100 *t/d garbage disposal power generating facility*, Qiuya Ni et al. (Chinese Academy of Sciences, Inst. of Electrical Engineering, Beijing, China). Another representative publication is *Intersociety Energy Conversion Engineering Conference and Exhibit* (IECEC), 35th, Las Vegas, Nev. (Jul. 24-28, 2000), Collection of Technical Papers. Vol. 2 (A00-37701 10-44). Also see American Institute of Aeronautics and Astronautics, 190, p. 1295-1299. REPORT NUMBER(S)-AIAA Paper 2000-3032.

AMTEC heat engines suffer from reliability issues due to the highly corrosive nature of the alkali metal working fluid. AMTEC engines also have very limited utility. Specifically, AMTEC engines can only be operated at very high temperatures because ionic conductive solid electrolytes achieve practical conductivity levels only at high temperatures. Indeed, even the low-temperature pressurization process must occur at a relatively high temperature, because the alkali metal working fluid must remain above its melt temperature at all times as it moves through the cycle. Mechanical pumps and even magneto-hydrodynamic pumps have been used to pressurize the low-temperature working fluid.

In an effort to overcome the above-described drawbacks of conventional mechanical and thermo-electrochemical heat engines, the Johnson Thermo-Electrochemical Converter (JTEC) system which can approximate a Carnot equivalent cycle (disclosed in U.S. Pat. No. 7,160,639 filed Apr. 28, 2003) was invented. The typical JTEC system is a heat engine that includes a first electrochemical cell (MEA) operating at a one temperature, a second electrochemical cell (MEA) operating at a different temperature from the first, a conduit system including a heat exchanger that couples the two cells together, and a supply of ionizable gas (such as hydrogen or oxygen) as a working fluid contained within the conduit system. Each MEA stack includes a non-porous membrane capable of conducting ions of the working fluid with porous electrodes positioned on opposite sides.

In the JTEC, working fluid passes through each MEA stack by releasing an electron to the electrode on the entering side, such that the ion (proton) can be conducted through the membrane to the opposite electrode. The working fluid is reconstituted within the opposite electrode as it re-supplies electrons to working fluid ions as they exit the membrane, the electrons having passed through an external load or controller. If a hydrogen pressure differential is applied across a membrane electrode assembly having an electrical load attached, it will supply power to the load as hydrogen passes from high pressure to low pressure. The process also operates in reverse. Voltage and current can be applied to an MEA to pump hydrogen from low pressure to high pressure.

Operating under a pressure differential, the high temperature cell will have a higher voltage than the low temperature cell, consistent with the Nernst equation. As in any other engine, the working fluid, hydrogen in this case, is compressed a low temperature and expanded at high temperature to produce net power output. Consistent current through both MEA maintains a constant pressure differential. Since the current (I) is the same through both cells, the voltage differential means that the power generated through the expansion of hydrogen in the high temperature cell is higher than that of the low temperature cell.

A number of challenges have been encountered with developing a JTEC that is suitable for widespread use, particularly considering the issues associated with using hydrogen as a working fluid. For example, hydrogen leakage through small defects in the conduit system may occur due to the small size of the hydrogen molecule. In particular, hydrogen leakage can occur at the interconnection joints of the conduit couplings between the high-temperature cell and the low temperature cell.

Further, unlike conventional fuel cells, where the open circuit voltage can be greater than one volt, the Nernst voltage from the hydrogen pressure differential across a MEA stack is in the range of only about 0.2 Volts. As such, many cells will have to be connected in series to achieve useful output voltage levels. In addition, each JTEC cell needs to have large membrane/electrode surface area in order to achieve useful levels of output current and minimum voltage loss due to membrane resistance. Considering the low operating voltages of individual cells and the low conductivity of available membrane materials, large membrane surface areas are needed to produce useful levels of power.

Membranes used in the JTEC need to have high diffusion barrier properties, because diffusion of working fluid (such as hydrogen gas) under the pressure differential across the membrane results in reduced electrical output and efficiency. However, available hydrogen ion conductive membrane materials that have useful ion conductivity, such as Nafion, a polymer manufactured by the DuPont Corp., generally have very poor molecular diffusion barrier properties and result in loss of the pressure differential required for operation. Conversely, available membrane materials such as ceramic ion conductors that have high molecular diffusion barrier properties generally have relatively low ionic conductivity, particularly at low to moderate temperatures and use of such materials would result is high system impedance and high polarization losses.

Accordingly, there is a need for a practical way of using available high barrier, low ion conductivity materials as thin large surface area membranes to provide a thermo-electrochemical heat engine that can approximate a Carnot equivalent cycle, and that eliminates the reliability and inefficiency problems associated with mechanical engines. The heat engine of the present invention fulfills this need.

BRIEF SUMMARY OF THE INVENTION

One embodiment of the present invention relates to a thermo-electrochemical converter, preferably configured as a JTEC, direct heat to electricity engine containing an ionizable working fluid media dissolved in a liquid solvent. The ionizable working media circulates within a continuous flow loop between the two MEA stacks within a system of high and low concentration conduits. The first MEA stack is connected to a heat source and functions to expand the working fluid from a high concentration to a low concentration. The expansion of the working fluid through the first MEA stack generates electricity. The second MEA stack is preferably connected to a heat sink and functions to pump the working fluid from a low to a high concentration. Electrical power is consumed by the process and the heat of solvation is rejected.

In one embodiment, wherein the MEA stacks operate as part of an engine, the heat source to which the first MEA stack is coupled is preferably at an elevated temperature relative to the temperature of the heat sink to which the second MEA stack is coupled. As such, the higher temperature MEA stack (i.e., the first MEA stack) has a higher voltage than the lower temperature stack (i.e., the second MEA stack). The voltage (power) generated by the high temperature MEA stack is high enough to overcome the voltage (power) of the low temperature MEA stack and have sufficient voltage (power) left over to power an external load, the level of current through each being the same.

In another embodiment, in which the MEA stacks operate as part of a heat pump application, the first MEA stack is preferably coupled to a heat source that is at a lower temperature relative to the temperature of the heat sink to which the second MEA stack is coupled. A controller extracts power from a low temperature first MEA stack to expand working fluid from high centration to low concentration as the heat of expansion is extracted from the low temperature heat source. The controller supplies power to the second MEA stack to compress working fluid from low concentration to high concentration whereby the heat of compression is rejected an elevated temperature heat sink. It is understood that a controller may be used to supply or extract power to or from a given MEA within a converter as needed to achieve desired performance as a heat engine or heat pump.

BRIEF DESCRIPTION OF THE SEVERAL VIEWS OF THE DRAWINGS

The following detailed description of preferred embodiments of the present invention will be better understood when read in conjunction with the appended drawing. For the purposes of illustrating the invention, there is shown in the drawing an embodiment which is presently preferred. It is understood, however, that the invention is not limited to the precise arrangements and instrumentalities shown. In the drawings.

DETAILED DESCRIPTION OF THE INVENTION

Figure 1:
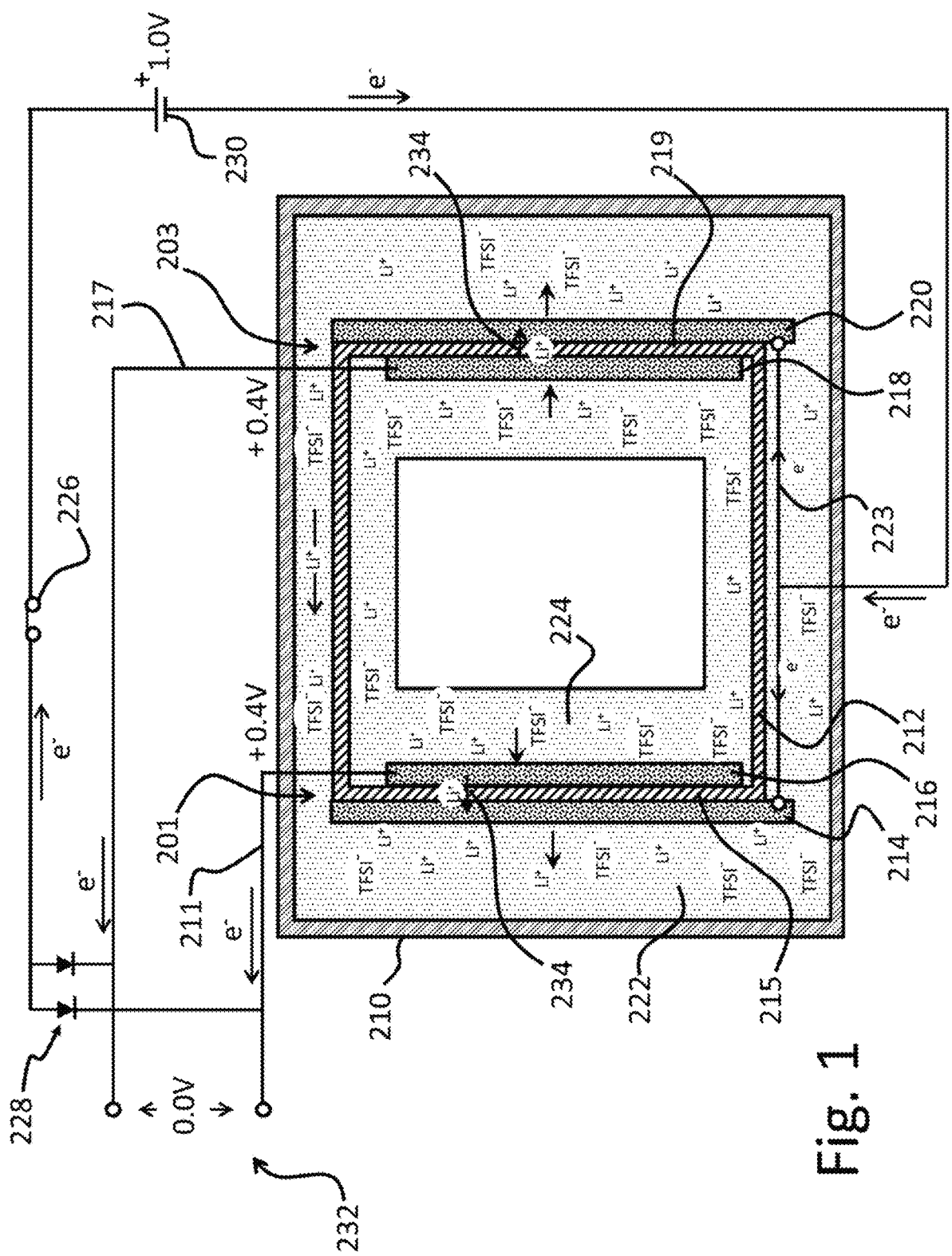
FIG. 1 is a diagram showing of a JTEC that utilizes a ionizable working media dissolved in a solvent at different concentration levels to produce a voltage differential, wherein power is applied to the electrodes to produce a working media concentration differential in accordance with an embodiment of the present invention.

Certain terminology is used in the following description for convenience only and is not limiting. The words "proximal," "distal," "upward," "downward," "bottom" and "top" designate directions in the drawings to which reference is made. The words "inwardly" and "outwardly" refer to directions toward and away from, respectively, a geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

It will also be understood that terms such as "first," "second," and the like are provided only for purposes of clarity. The elements or components identified by these terms, and the operations thereof, may easily be switched.

Referring to the drawings in detail, wherein like numerals indicate like elements throughout the several views, FIGS. 1-6 show preferred embodiments of a heat engine including one or more MEA stacks. The terms "electrochemical cell," "membrane electrode assembly stack," "MEA stack," "MEA cell" and "stack" are used interchangeably herein.

Referring to FIG. 1, there is shown an example heat engine that uses lithium as an ionizable working fluid dissolved in a solvent. Specifically, anhydrous organic amines form the solvent which dissolve the alkali metal working fluid. For example, pentyl amine, pyridine, HMPO, isopropylamine, triethylamine, triethyltetramine, ethylenediamine or anhydrous ammonia can dissolve the lithium. Housing 210 encloses the active components of the converter. A first MEA membrane electrode assembly (MEA) cell 201 is formed by a first electrode 216, a second electrode 214, and a first solid electrolyte membrane wall 215 sandwiched between the first and second electrodes 216, 214. The first MEA cell 201 is provided on one side of the housing 210. On an opposing side of the housing 210, a second MEA cell 203 is formed by a first electrode 218, a second electrode 220, and a second solid electrolyte membrane wall 219 sandwiched between the first and second electrodes 218 and 220. The first and second solid electrolyte membranes 215, 219 are part of solid enclosure 212. A number of suitable membrane materials are available for use in the membrane electrode assemblies. Preferably a solid ceramic and/or a glass electrolyte having limited working fluid permeability is used. Given lithium as the example working fluid, suitable lithium ion conductive separator membrane materials include; but, are not limited to lithium Beta" alumina or Lithium Lanthanum Zirconium Oxide. However, it will be understood by those skilled in the art that any material, preferably any polymer or inorganic material, which demonstrates suitable working fluid barrier and ion conductive properties over a useful temperature range may be used to form the MEA cells.

The first and second MEA cells 201 and 203 are surrounded or encompassed by a first solvent solution 222. More particularly, the second electrodes 214 and 220 of the first and second MEA cells 201 and 203 are contained within the housing 210 and surrounded by the first solvent solution 222. The solid electrolyte enclosure 212, in turn, encloses a second solvent solution 224 and the first electrodes 216 and 218.

A conductor 223 electrically connects the second electrodes 214 and 220 to each other and to the negative terminal of a start-up charging power source 230. A switch 226 connects the positive terminal of the start-up power source 230 to the first electrodes 216, 218 through isolation diodes 228. Both of the first and second solvent solutions 222 and 224 contain dissolved lithium. Accordingly, with switch 226 closed, the start-up power source 230 supplies the current needed to oxidize lithium within the first electrodes 216, and 218. The resulting lithium ions are then conducted through the solid electrolyte 215 and 219, reduced in the second electrodes 214 and 220. The reduced lithium subsequently dissolves into the first solvent solution 222, as indicated by arrows 234 in FIG. 1. The extraction of lithium through the solid electrolyte 212 results in a concentration gradient that causes dissolved lithium to diffuse to the first electrode 216 of the first MEA cell 201 and the first electrode 218 of the second MEA cell 203, as indicated by arrows 236.

For example, taking an arbitrarily selected one volt start-up power source 230 and allowing for a 0.6 volt drop across the isolation diodes 228, the concentration levels of lithium in the first and second solvent solutions 222, 224 are thus driven to a voltage potential across the first and second MEA cells 201 and 203 of 0.4 volts each, at which point current flow terminates.

As shown in FIG. 1, first and second leads 211 and 217 connect first electrode 216 and first electrode 218, respectively, to terminal 232. It should be noted that dissolution of a working fluid into a solvent may be exothermic or it may be endothermic. In the exothermic case, power is consumed in charging the working fluid from high concentration to low concentration and power is produced when discharging working fluid from low concentration to high concentration. On the other hand, for endothermic working fluid dissolution reactions, power will be produced in discharging the working fluid from high concentration to low concentration and power will be consumed when the working fluid is charged from low concentration to high concentration.

Figure 2:
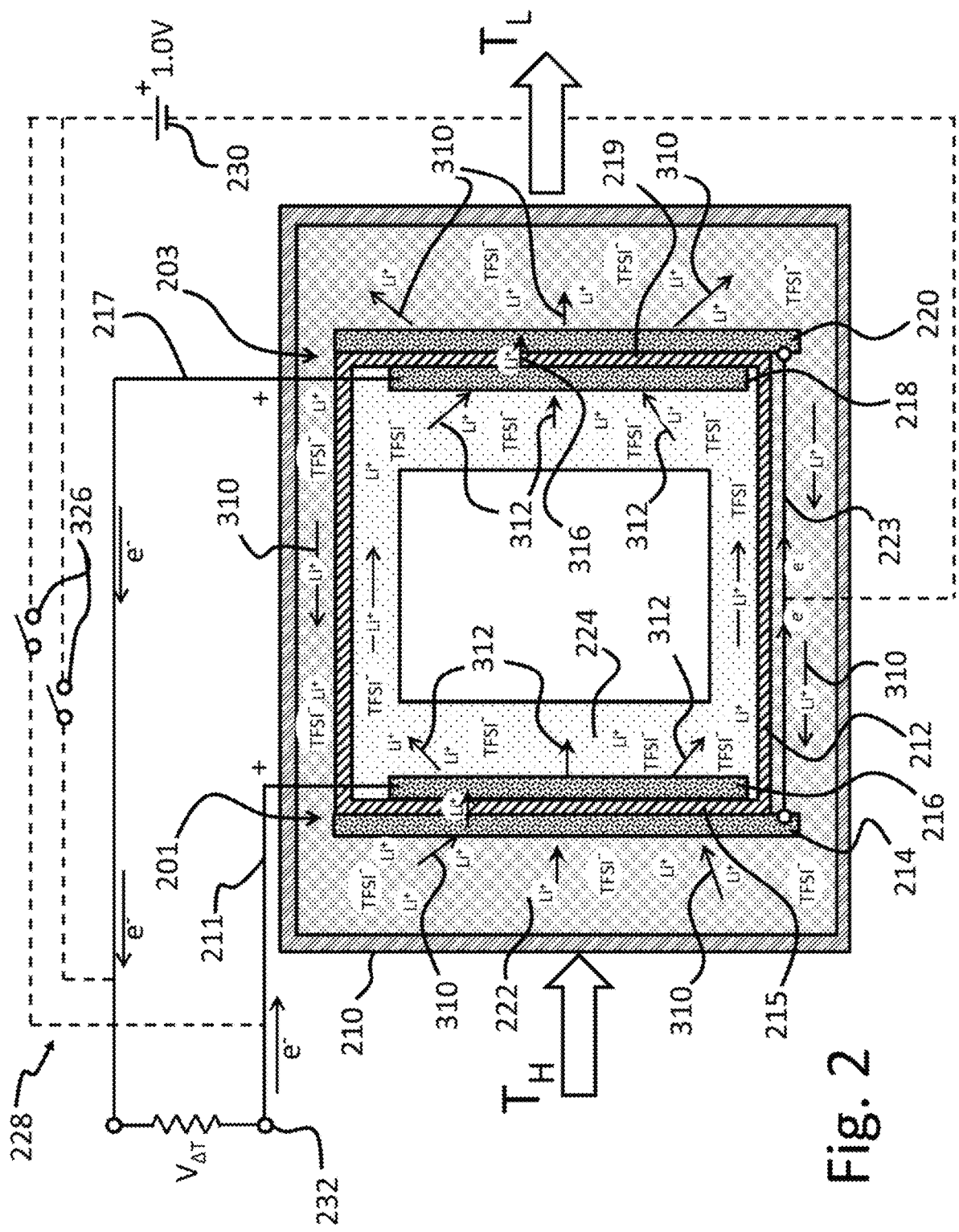
FIG. 2 is diagram showing operation of a JTEC that utilizes a ionizable working media dissolved in a solvent at different concentration levels to produce a voltage differential operating to produce power under an applied temperature differential, in accordance with an embodiment of the present invention.

Referring to FIG. 2, there is shown the operation of the dissolved lithium cell with heat input, from heat input at one temperature TH and heat rejection to a heat sink at a different temperature TL. With the switch 226 open, the start-up power source 230 is removed from the circuit. Under the temperature differential, the first and second MEA cells 201 and 203 produce power at a voltage VAT across a load at terminal 232. Voltage VAT is determined by the voltage difference between the first MEA 201 and the second MEA 203 which is determined by their temperature difference. With solution 222 at a higher concentration than solution 224 and a positive electrochemical temperature coefficient with TH greater than TL, the voltage of the first MEA cell 201 will be higher than that of the second MEA cell 203. The higher voltage of the first MEA cell 201 enables the first MEA cell 201 to discharge itself by conducting ions from the high concentration, second electrode 214 through the electrolyte plane 215 to the low concentration, first electrode 216, thus driving a reverse current through the lower voltage, second MEA cell 203.

The reverse current flow through the second MEA cell 203 causes the second MEA cell 203 to pump an equivalent current of lithium flow from the low concentration, second solvent solution 224 via the first electrode 218 back to the high concentration, first solvent solution 222 via the second electrode 220, as represented by arrow 316 in FIG. 2. Dissolved lithium enters the high concentration, second electrode 214 of the first MEA cell 201 from the second electrode 220 of the second MEA cell 203 by diffusion through the first solvent solution 222, as indicated by arrows 310 in FIG. 2. Lithium enters the first electrode 218 of the second MEA cell 203 from the first electrode 216 of the first MEA cell 201 by diffusion through the low concentration, second solvent solution 224, as indicated by arrows 312 in FIG. 2, in order to maintain continuous current flow. Operation of the cell is such that the concentration levels within the two solvent solutions 222, 224 remains constant and the difference in voltage between the two MEA cells 201, 203 is applied across the load at the terminal 232 less resistive losses. It is understood that the start-up power source 230 is not needed if the solvent solutions 222 and 224 are initially placed in the cells with a desired working media concentration level in each. The electrical conductor 223 enables electron flow between the second electrodes 214 and 220 to maintain circuit continuity.

Preferably, the concentration levels of the working media dissolved within solutions 222 and 224 are less than saturation, i.e. containing no undissolved working media when at equilibrium. Under this condition, the level of concentration of dissolved working media within each solution ideally remains constant and will not be temperature responsive.

Figure 3:
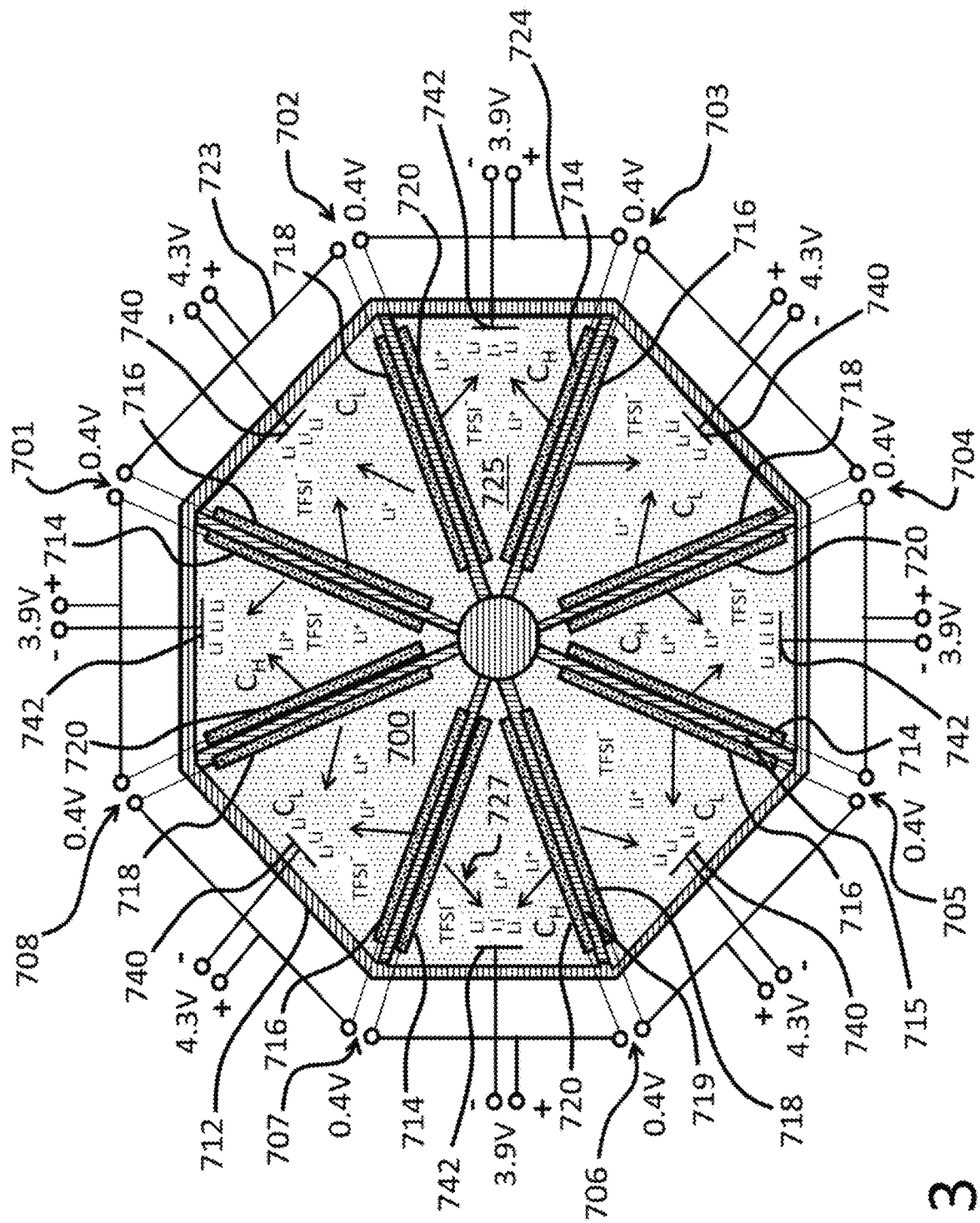
FIG. 3 is a diagram of a JTEC in a multi-MEA toroidal configuration that uses electrochemically active electrodes coupled to each other by an ion conductive electrolyte, showing charging of the active electrode material, in accordance with an embodiment of the present invention.

Referring to FIG. 3, there is shown an embodiment of the present invention wherein a plurality of MEA cells are arranged in a toroidal configuration, and wherein the relative distance between electrodes is minimized in order to minimize the impedance associated with lithium diffusion or convective circulation between each MEA cell. The converter is contained by housing 712. In the illustrated embodiment, there are eight MEA cells 701, 702, 703, 704, 705, 706, 707 and 708 configured sequentially back to back in the toroidal structure. Each MEA cell 701, 703, 705, 707 of a first set of the MEA cells includes a first electrode 714, a second electrode 716 and an electrolyte separator 715 disposed between the first and second electrodes 714, 716. Each MEA cell 702, 704, 706, 708 of a second set of the MEA cells, each including a first electrodes 718, a second electrodes 720 and a separators 719 positioned between the first and second electrodes 718, 720. The individual MEA cells 701, 703, 705, 707 of the first set are interleaved in an alternating sequence with MEA cells 702, 704, 706, 708 of the second set.

In a first set of sections of the toroidal structure, solution 700 couples second electrodes 716 of each of the first set of MEA cells 701, 703, 705, 707 to first electrodes 718 of each of the second set of MEA cells 702, 704, 706, 708 respectfully to each other. In a second set of sections of the toroidal structure, solution 725 ion conductively couples first electrodes 714 of each of the first set of MEA cells 701, 703, 705, 707 to second electrodes 720 of each of the second set of MEA cells 702, 704, 706, 708 respectfully to each other. The solutions 700 and 725 will have different lithium concentration levels, depending on the desired operating voltages of the MEA cells, i.e. first electrodes 714 of the first set of MEA cells 701, 703, 705, 707 and the second electrode 720s of the second set of MEA cells 702, 704, 706, 708 relative to the second electrodes 716s of the first set of MEA cells 701, 703, 705, 707 and the first electrodes 718 of the second set of MEA cells 702, 704, 706, 708. Leads 723 connect each second electrodes 716 of the first set of MEA cells 701, 703, 705, 707 to first electrodes 718 of the second set of MEA cells 702, 704, 706, 708 respectively at each section.

Figure 4:
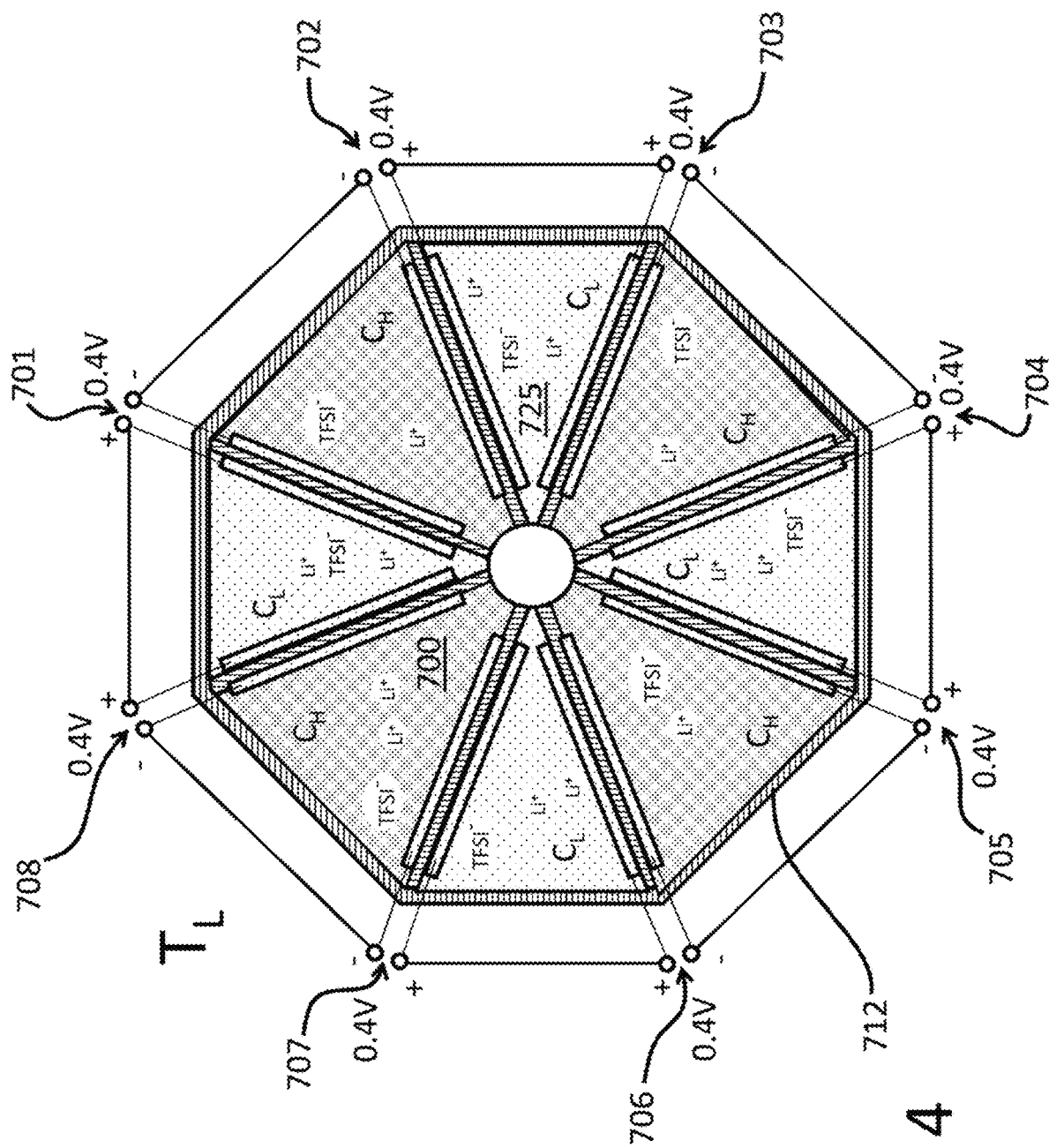
FIG. 4 is a diagram of a JTEC in a multi-MEA toroidal configuration that uses electrochemically active electrodes coupled to each other by an ion conductive electrolyte showing voltage at a state of charge of the active material.

Leads 724 connect each first electrodes 714 of the first set of MEA cells 701, 703, 705, 707 to each second electrodes 720 of the second set of MEA cells 702, 704, 706, 708 respectively at each section. In this example, lithium solutions 700 and 725 are at different lithium concentration levels with solution 725 ($C_H$) being at a higher concentration level relative to lower lithium concentration solution 700 ($C_L$). The relative concentration levels are such that with both all of the MEA at the same temperature, the voltage across each MEA is 0.4 volts. Note, as illustrated in FIG. 4, the each MEA in sequence around the toroidal structure has a polarity opposite that of the next MEA in the sequence such that there is no net voltage differential or current flow.

Figure 5:
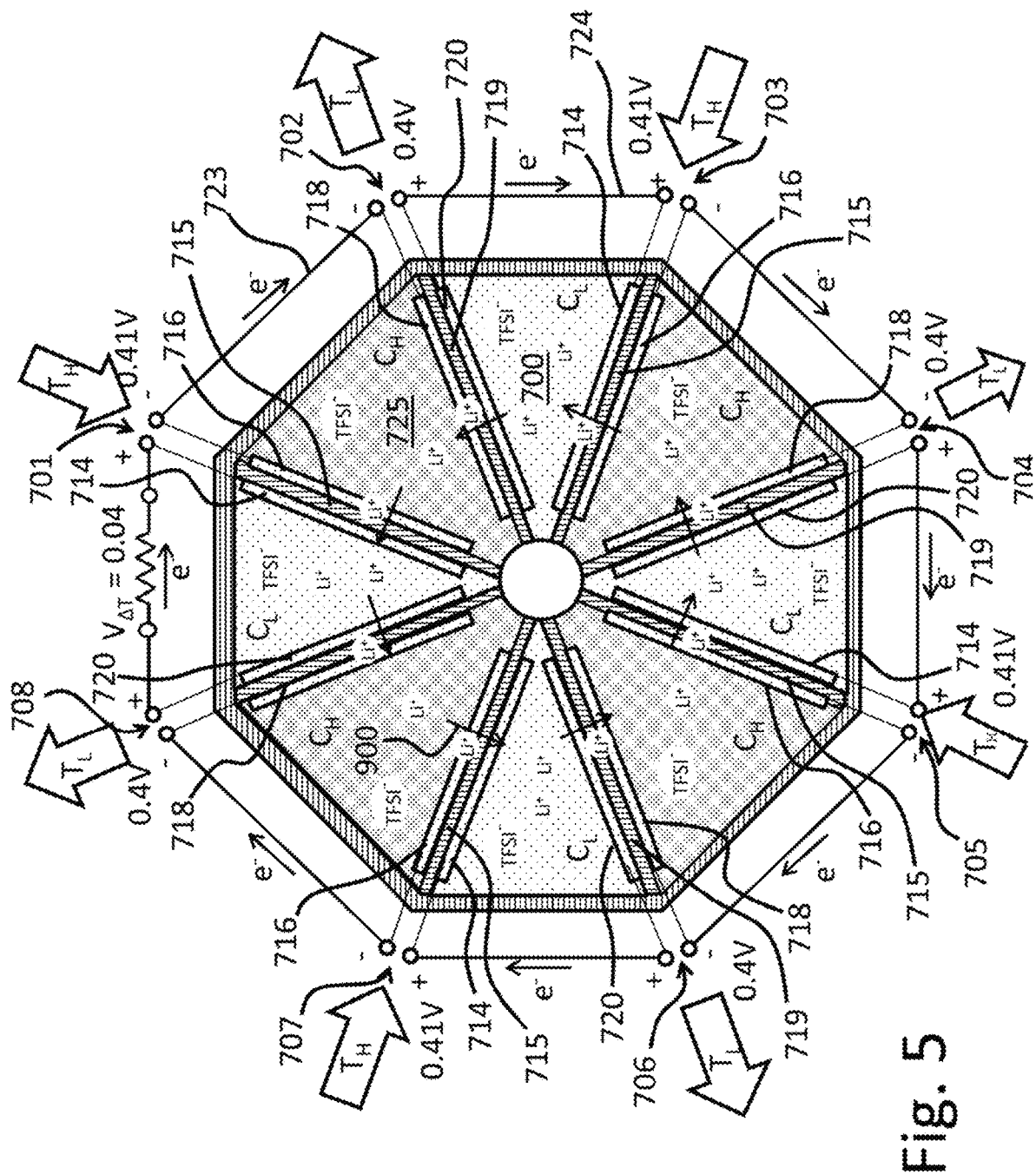
FIG. 5 is a diagram of a JTEC in a multi-MEA toroidal configuration that uses electrochemically active electrodes coupled to each other by an ion conductive electrolyte showing operation on heat to produce electrical power, in accordance with an embodiment of the present invention.

Now referring to FIG. 5, heat at high temperature $T_H$ is input to the alternating first set of MEA cells 701, 703, 705, 707 to create and maintain a in temperature that is higher than TL. Heat at temperature $T_L$ is removed from the alternating second set of MEA cells 702, 704, 706, 708 to maintain a temperature lower than that produced by heat input at $T_H$. The voltage change created between adjacent cells and thus the net voltage $V_{AT}$ applied across a load connected between electrodes 714 and 720 of cells 701 and 708, respectively, is a function of the difference in temperature between $T_H$ and $T_L$. Note that the cells are electrically interconnected in series so that the voltage difference between adjacent MEA pairs created by the temperature difference is additive. For example, consider the MEA pair 701 and 702. For a positive electrochemical temperature coefficient, the voltage of the MEA cells with temperature maintained at $T_H$ will be higher than that of the MEA cells with temperature maintained at $T_L$, in this example, 0.41 Volts vs 0.40 Volts. The higher voltage of MEA cells ($T_H$) will discharge themselves by conducting ions from their high concentration electrodes in solutions 725 through their electrolyte separator planes to their low concentration electrodes in solutions 700, thus driving a reverse current through their adjacent lower voltage MEA cells ($T_L$) whereby an equivalent current of lithium ion flow will be pumped from their low concentration electrodes in solutions 700 to their high concentration electrodes in solutions 725. For example, as electrons are released in second electrode 716 of the MEA cell 701, with oxidation of lithium from solution 725 and the conduction of ions through its electrolyte 715, conductor 723 supplies the electrons to the first electrode 718 of the adjacent MEA cell 702 for the reduction of ions entering its first electrode 718 from its electrolyte separator 719. The concentration level of solution 725 thus remains constant as lithium is desorbed from solution by being oxidized and conducted through MEA 701 it is replenished by MEA 702 being driven in reverse to pump lithium from low concentration solution 700 into solution 725.

The first electrode 714 of the MEA cell 703 is connected to the second electrode 720 of the adjacent MEA cell 702 such that the lithium concentration level in solution 700 between the first and second electrodes 714 and 720 will be maintained, and so on. Note that lithium is conducted continuously counterclockwise in the diagram whereas electrons are conducted clockwise. Note that in this example, TH and TL are selected relative to each other such that the voltage differential produced by each cell pair is 0.01 volts. The total voltage VAT for series the four cell pairs is 0.04 volts.

Figure 6:
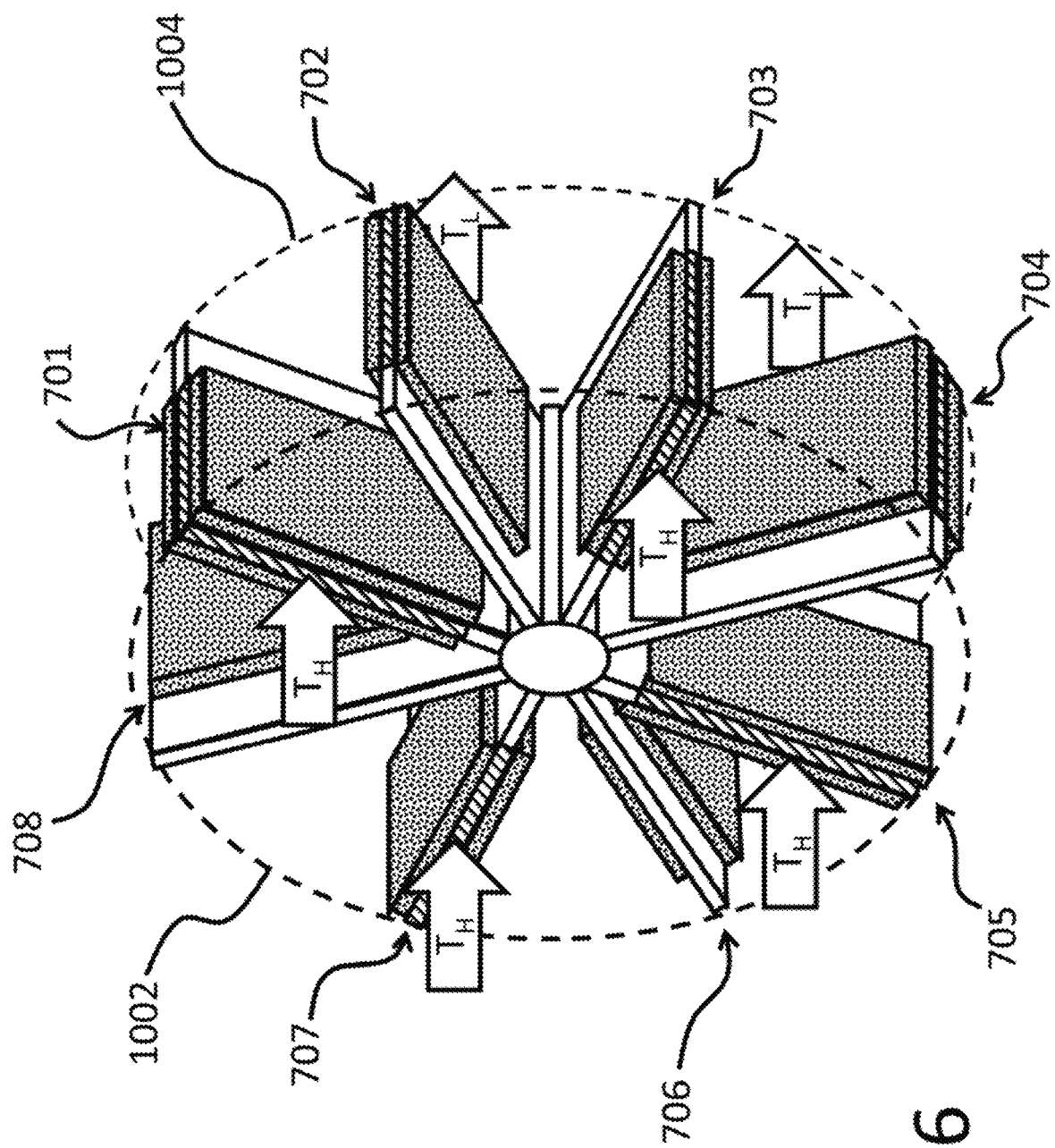
FIG. 6 is a three dimensional diagram of a JTEC in a multi-MEA toroidal configuration that uses electrochemically active electrodes showing heat input and output to produce electrical power.

FIG. 6 is a three dimensional image showing thermal coupling of the electrodes 714, 716 of first set of MEA cells 701, 703, 705, 707 to a heat input plane 1002 at temperature $T_H$. The electrodes 714, 716 of the first set of MEA cells 701, 703, 705, 707 extend forward for thermal contact with the plane 1002. On the other hand, the electrodes 718, 720 of the second set of MEA cells 702, 704, 706, 708 extend rearward to make thermal contact with a heat sink plane 1004 at the temperature TL.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A direct heat to electricity converter comprising:
    a housing;
    a first membrane electrode assembly and a second membrane electrode assembly, each membrane electrode assembly including a first porous electrode, a second porous electrode and an ion conductive membrane sandwiched therebetween;
    a solid enclosure;
    a first solvent solution and a second solvent solution; and
    a working fluid media dissolved within the first and second solvent solutions at different concentration levels, such that one of the first and second solvent solutions is a first working fluid concentration solution and the other of the first and second solvent solutions is a second working fluid concentration solution, a working fluid concentration level of the first working fluid concentration solution being higher than a working fluid concentration level of the second working fluid concentration solution,
    wherein the first and second membrane electrode assemblies are contained within the housing and surrounded by the first solvent solution, such that the second electrode of each of the first and second membrane electrode assemblies is coupled to the first working fluid concentration solution,
    wherein the solid enclosure is surrounded by the first solvent solution and the solid enclosure encloses the second solvent solution and the first electrode of each of the first and second membrane electrode assemblies, such that the first electrode of each of the first and second membrane electrode assemblies is coupled to the second working fluid concentration solution,
    wherein the ion conductive membrane of each membrane electrode assembly is a conductor of ions of the working fluid, and
    wherein the working fluid media concentration levels are less than saturation and are independent of temperature.

2. The direct heat to electricity converter according to claim 1, further comprising an external power source connected to the first and the second porous electrodes of at least one of the first and second membrane electrode assemblies, power being applied to the porous electrodes and driving working fluid flow as electron flow forced by the external power source induces ion conduction through the ion conductive membrane of the connected membrane electrode assembly to drive a working fluid concentration difference between the first working fluid concentration and second working fluid concentration solutions coupled to its first and second porous electrodes.

3. A direct heat to electricity converter according to claim 1, wherein the first membrane electrode assembly comprises a plurality of first membrane electrode assembly cells and the second membrane electrode assembly comprises a plurality of second membrane electrode assembly cells.

4. The direct heat to electricity converter according to claim 1, wherein pairs of first working fluid concentration electrodes are coupled to each other by the high concentration working fluid solution and pairs of second working fluid concentration electrodes are coupled to each other by the low concentration working fluid solution, each membrane electrode assembly displaying a voltage differential between its first and second porous electrode that is determined by its temperature and by the difference in working fluid concentration between first working fluid concentration and second working fluid concentration solutions.

5. The direct heat to electricity converter according to claim 4, wherein the working fluid media have endothermic heats of dissolution, a membrane electrode assembly being discharged as it supplies power by conducting working fluid from the first working fluid concentration solution to the second working fluid concentration solution, and a membrane electrode assembly being charged as it consumes power in conducting working fluid from the second working fluid concentration solution to the first working fluid concentration solution.

6. The direct heat to electricity converter according to claim 5, wherein the membrane electrode assemblies are charged and discharged during operation to maintain a stable concentration level in the first working fluid concentration solution and a stable concentration level in the second working fluid concentration solution.

7. The direct heat to electricity converter according to claim 5, further comprising a power controller, a heat sink coupled to the first membrane electrode assembly and a heat source is coupled to the second membrane electrode assembly, each of the first and second membrane electrode assemblies displaying a voltage differential between its first and second porous electrode that is determined by its temperature and by the difference in working fluid concentration between the first working fluid concentration solution and the second working fluid concentration solution, the power controller supplying charge power to the one of the first and second membrane electrode assemblies coupled to the heat sink causing it to reject heat thereto, the power controller extracting discharge power from the other one of the first and second membrane electrode assemblies coupled to the heat source causing it to extract heat therefrom.

8. A direct heat to electricity converter according to claim 7, wherein the first membrane electrode assembly comprises a plurality of first membrane electrode assembly cells and the second membrane electrode assembly comprises a plurality of second membrane electrode assembly cells.

9. The direct heat to electricity converter according to claim 4, wherein the working fluid media have exothermic heats of dissolution, a membrane electrode assembly being discharged as it supplies power by conducting working fluid from the second working fluid concentration solution to the first working fluid concentration solution, and a membrane electrode assembly being charged as it consumes power in conducting working fluid from the first working fluid concentration solution to the second working fluid concentration solution.

10. The direct heat to electricity converter according to claim 9, wherein the membrane electrode assemblies are charged and discharged during operation to maintain a stable concentration level in the first working fluid concentration solution and a stable concentration level in the second working fluid concentration solution.

11. The direct heat to electricity converter according to claim 9, further comprising a power controller, a heat sink coupled to the first membrane electrode assembly and a heat source coupled to the second membrane electrode assembly, each of the first and second membrane electrode assemblies displaying a voltage differential between its first and second porous electrode that is determined by its temperature and by the difference in working fluid concentration between the first working fluid concentration solution and the second working fluid concentration solution, the power controller supplying charge power to the one of the first and second membrane electrode assemblies coupled to the heat sink causing it to reject heat thereto, the power controller extracting discharge power from the other one of the first and second membrane electrode assemblies coupled to the heat source causing it to extract heat therefrom.

12. A direct heat to electricity converter according to claim 11, wherein the first membrane electrode assembly comprises a plurality of first membrane electrode assembly cells and the second membrane electrode assembly comprises a plurality of second membrane electrode assembly cells.

13. The direct heat to electricity converter according to claim 4, further comprising a heat sink at one temperature coupled to one of the first and second membrane electrode assemblies and a heat source at a different temperature from the heat sink coupled to the other one of the first and second membrane electrode assemblies, each membrane electrode assembly being electrically coupled to the other, each membrane electrode assembly displaying a voltage differential between its first and second porous electrodes that is determined by its temperature and by the difference in working fluid concentration between the first working fluid concentration solution and the second working fluid concentration solution, the heat source and heat sink imposing a temperature difference and thereby a voltage difference between the membrane electrode assemblies.

14. A direct heat to electricity converter comprising:
a housing;
a working fluid media;
a first membrane electrode assembly and a second membrane electrode assembly, each membrane electrode assembly including a first porous electrode, a second porous electrode and an ion conductive membrane sandwiched therebetween, the ion conductive membranes within the first and second membrane electrode assemblies being conductors of ions of the working fluid media;
a solid enclosure;
a first solvent solution and a second solvent solution, the working fluid media being dissolved within the first and second solvent solutions at different concentration levels, such that one of the first and second solvent solutions is a first working fluid concentration solution and the other of the first and second solvent solutions is a second working fluid concentration solution, a working fluid concentration level of the first working fluid concentration solution being higher than a working fluid concentration level of the second working fluid concentration solution, the working fluid media concentration levels being less than saturation and independent of temperature; and
a power controller supplying charge power to the first membrane electrode assembly causing it to reject heat in conducting working fluid from one of the solvent solutions to the other, the power controller extracting discharge power from the second membrane electrode assembly causing it to absorb heat in conducting working fluid from one of the solvent solutions to the other,
wherein the first and second membrane electrode assemblies are contained within the housing and surrounded by the first solvent solution, such that the second electrode of each of the first and second membrane electrode assemblies is coupled to the first working fluid concentration solution,
wherein the solid enclosure is surrounded by the first solvent solution and the solid enclosure encloses the second solvent solution and the first electrode of each of the first and second membrane electrode assemblies, such that the first electrode of each of the first and second membrane electrode assemblies is coupled to the second working fluid concentration solution.

15. A direct heat to electricity converter according to claim 14, wherein the first membrane electrode assembly comprises a plurality of first membrane electrode assembly cells and the second membrane electrode assembly comprises a plurality of second membrane electrode assembly cells.

* * * * *